Dec. 6, 1955  H. EMMENS  2,726,167
METHOD OF COATING CATHODE RAY TUBE
Filed Nov. 18, 1952
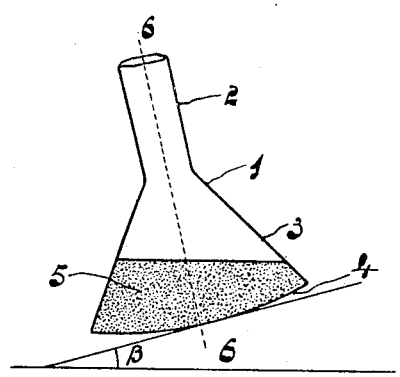
INVENTOR
HENDRIK EMMENS
BY
AGENT United States Patent Office 2,726,167
Patented Dec. 6, 1955

2,726,167

METHOD OF COATING CATHODE RAY TUBE

Hendrik Emmens, Eindhoven, Netherlands, assignor to Hartford National Bank and Trust Company, Hartford, Conn., as trustee Application November 18, 1952, Serial No. 321,231

Claims priority, application Netherlands January 10, 1952

3 Claims. (Cl. 117—33.5)

The invention relates to a method of manufacturing cathode-ray tubes, more particularly to a method of providing a luminescent screen in a cathode-ray tube. The invention moreover relates to cathode-ray tubes manufactured by such a method.

For providing a luminescent screen in a cathode-ray tube use is nowadays very often made of a method in which the luminescent substance precipitates as a sediment from a suspension on the carrier. In this method the binder required to cause the luminescent substance to adhere to the carrier is, as a rule, also contained in the suspension medium. Consequently, the grains of suspension material are enveloped in a thin film of binder when they sink down. However, the binder may, as an alternative, be applied previously to the carrier.

If the cathode-ray tube has the conventional shape of a cone and a cylindrical part secured thereto for housing the electrode system, the aforesaid method of sedimentation (in English and American literature referred to as the settling method) has a limitation. The term "cone" need not be understood to mean herein the mathematical shape of a cone, since nowadays many cathode-ray tubes are provided with a rectangular window, the glass sidewall extending from the periphery of this window to the cylindrical part, so that a kind of pyramid is formed. In all these tubes a comparatively sharp angle is formed between the window of the tube and the sidewall. It has been found that in the settling method the edges of the carrier of the luminescent screen and, in general, the image window itself, are not satisfactorily coated with luminescent material. This is due to the fact that the thickness of the layer of suspension medium over the edge of the carrier is smaller than over the centre of the carrier, owing to the angle between the sidewall and the window. The quantity of suspension at this area is smaller, so that less suspension material will settle there on the screen. Efforts have been made to obviate this disadvantage by reducing the temperature of the suspension relative to the ambient temperature during the settling process. Owing to this difference in temperature a gentle flow is produced in the suspension liquid, so that luminescent substance particles are also conveyed to the edge of the screen. However, this method does not always yield satisfactory results, which may be due to the fact that the flow in the suspension liquid can be controlled and reproduced with great difficulty only. If the luminescent material to be settled is composed of several constituents, there is a further limitation in that the constituent having the lowest specific weight and/or the smallest granular size is more readily carried along by the flow, so that "de-mixing" occurs. Consequently, a greater quantity of this constituent will be conveyed to the edge of the screen than that of the other constituents. Hence, the colour of the luminescent light is not identical throughout the surface of the screen.

It is obvious that the aforesaid limitations are the more conspicuous, the more acute is the angle between the bottom of the conical part and its wall.

Tubes entirely made of glass have a gradual merging zone between the bottom and the wall of the conical part. This merging zone has, as a rule, such a strong curvature that it cannot be used as a carrier for the screen. Cathode-ray tubes in which the wall of the conical part is made of metal have substantially no merging zone, so that the entire bottom could be used as a carrier. In such tubes the aforesaid disadvantages are particularly evident, since it is not even then possible to use the whole bottom of the cone as a carrier.

The invention has for its object to obviate the aforesaid disadvantages as much as possible by providing a method, the results of which are controllable and reproduceable.

A method according to the invention for providing a luminescent layer in a cathode-ray tube, having a conical part, the luminescent substance being caused to settle from a suspension on the bottom of the conical part, is characterized in that during the settling process the bottom of the conical part is at an angle of 5 to 20° to the horizontal and is turned slowly about the axis of symmetry of the conical part of the tube.

Since the bottom of the conical part is at an angle to the horizontal, the layer of liquid is, on one side, higher over the edge of the bottom than it would be in horizontal position. Owing to the rotation of the bottom, all parts of the edge successively reach this favorable position. The speed of rotation is only a few revolutions a minute. The quantity of luminescent material settling on the edge may thus be substantially equal to the quantity settling in the centre of the screen. It has been found that a uniform coating does not require the angle between the bottom and the horizontal to be so great that the generatrix of the wall of the conical part should be exactly vertical on one side in the most favourable position. This would, in general, even be impossible, since the slope of the bottom of the conical part would be so steep that the luminescent material would glide towards the edges. The angle of the slope is, of course, dependent to a certain extent upon the binder used, the quantity of binder, the granular size and the specific weight of the luminescent material.

As stated above particularly with cathode-ray tubes having a metal wall for the conical part, it is very difficult to coat the edges of the screen satisfactorily. Therefore the invention may be employed with great advantage in such tubes.

Since in the method according to the invention no means is used such as that of the temperature difference, described above, which is affected by the granular size and the specific weight of the luminescent material, the method according to the invention may be carried out with excellent results in the manufacture of a screen consisting of a mixture of luminescent materials having various granular sizes and/or specific weights. Then the effect of these values is the same for the centre and the edge of the screen.

In order that the invention may be readily carried into effect, it will now be described in detail with reference to the accompanying drawing.

Referring to the figure of the drawing, reference numeral 1 designates the bulb of a conventional cathode-ray tube. It comprises a cylindrical portion 2 and a conical portion 3, which is closed by the bottom 4. The conical portion contains the suspension 5 of the luminescent material. During the settling process the bulb is arranged in the manner shown in the drawing, the tangent to the centre of the slightly spherical bottom being at an angle $\beta$ to the horizontal. During the process the bulb is turned about the axis 6—6 of symmetry of the conical portion.

What I claim is:

1. A method of providing a luminescent screen in a cathode-ray tube which comprises filling a portion of a conical portion of an envelope of a cathode ray tube having a given longitudinal axis of symmetry with a suspension of a luminescent material, inclining said envelope with respect to a horizontal plane so that said longitudinal axis thereof forms an angle of about 5 to 20° with respect to said horizontal plane, and slowly rotating the envelope about said axis of symmetry to thereby uniformly deposit a layer of luminescent material on a portion of the inner surface of said envelope.

2. A method of providing a luminescent screen in a cathode ray tube as claimed in claim 1 in which the speed of rotation of the envelope during settlement of the screen is several revolutions per minute.

3. A method of providing a luminescent screen in a cathode ray tube as claimed in claim 1 in which the conical portion of the envelope has a metal wall portion which is closed at one end with a glass portion.

References Cited in the file of this patent

UNITED STATES PATENTS

| | | |
|---|---|---|
| 2,119,309 | Batchelor | May 31, 1938 |
| 2,223,830 | Leverenz | Dec. 3, 1940 |
| 2,616,816 | De Gier | Nov. 4, 1952 |